Figure 1:
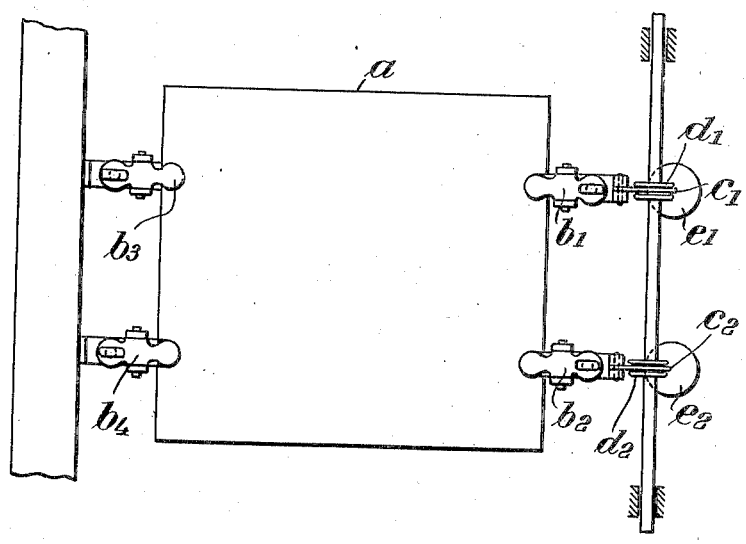

April 8, 1941.    B. ENGELS    2,237,343

METHOD OF TEMPERING GLASS PLATES AND SHEETS

Filed Jan. 22, 1938

Inventor:
Bernhard Engels
by Owen & Owen
Attorneys

Patented Apr. 8, 1941

2,237,343

UNITED STATES PATENT OFFICE 2,237,343

METHOD OF TEMPERING GLASS PLATES AND SHEETS

Bernhard Engels, Waldenburg-Altwasser, Silesia, Germany

Application January 22, 1938, Serial No. 186,395
In Germany November 27, 1936

7 Claims. (Cl. 49—45)

This invention relates to a method and device for tempering glass plates.

According to a method known for decades, glass plates are tempered by placing each plate on a cooled metal plate and pressing it between this supporting plate and an equally cooled upper companion plate. The rapid cooling thus effected produces the desired hardening.

The drawbacks connected with this method are well known. The plates obtained are not perfectly clear or the surface thereof is unfavorably affected by the mechanical action of the cooled metal plates. Furthermore, tempering lacks uniformity, and when it breaks the glass does not disintegrate in the form of blunt-edged crumbly pieces as desired, particularly not if after tempering the surface of the plate is subjected to a new treatment.

During the last few years tempering by air has therefore acquired increasing importance. This method consists in applying cold air to both sides of a heated vertically suspended glass plate by means of properly distributed nozzles and thereby insuring rapid cooling in quite a uniform manner.

Although this method complies with practical requirements, it nevertheless is open to the objection that the vertical suspension of the plate produces irregular tensile stresses which differ in the various portions of the area according to the size of the plate and the weight of the supported plate portions. It is therefore highly desirable to render tensile stresses throughout the plate as uniform as possible and, moreover, regulatable to attain a uniform hardening effect.

The object of the invention is to provide a method which meets the latter requirement and which makes it possible, furthermore, to carry out tempering by air in horizontal instead of vertically suspended position of the plate whilst avoiding the difficulties connected therewith which could not be overcome hitherto and which are due to the fact that the horizontally disposed plate, requiring to be heated up to a temperature approaching its re-softening temperature, deflects owing to gravity action and that the heat treatment of the plate involves deformations also in the horizontal direction or in the direction of its plane as a result of expansions and contractions caused, respectively, by heating and cooling.

The invention eliminates or continually automatically compensates these influences by causing the plates or sheets that are to be tempered to be kept in horizontal position during tempering, if necessary also in a position inclined toward the horizontal when the whole arrangement is altered, by means of regulatable constant forces which act thereon independently of the deformations of the plate resulting from changes in temperature and gravity and thereby continually compensate the deforming influences exerted upon the plate by gravity and temperature variations.

These forces are preferably applied by tensioning means which engage opposite edges of the plate while the points of application automatically shift in horizontal direction with the deformations and which freely hold the plate or the portion thereof concerned, so that both surfaces of the plate, apart from the locally restricted points of application of the tensioning means, can be exposed to the action of blast nozzles or other known cooling means in a highly favorable manner and without the least obstruction.

The tensile forces may be applied to two or more edges of the plate, for instance to all four sides of a square plate, or in case of a round plate may act in different radial directions, it being only necessary to provide for oppositely acting forces which balance each other.

This does not mean of course that tensioning means must act on both opposite edges. The plate may be rigidly secured on one side and subjected to the tensile stresses only from the direction of the opposite, so that in accordance with known physical laws opposite forces which balance each other are developed.

The magnitude of the tensile forces to be applied depends upon the dimensions, thickness and weight of the plate to be tempered and its degree of softening, and must be empirically ascertained in each instance. The forces may, however, be greater than is absolutely necessary to compensate gravity with a view to producing states of stress in the surface layers of the plate, which have special effects during tempering.

The tensioning devices are preferably regulatable. In the simplest type of device for carrying out the new method the plate is held for instance at one edge by two rigidly secured tongs, etc., and the tongs attached to the opposite edge are loaded by means of rope guides and reversing rollers with weights which may be adjusted to suit requirements.

Instead of by mechanical means as described the deforming influences upon the plate may be compensated or eliminated also in a different manner if tempering is effected by blown air. In this instance, the air nozzles may for instance act in such a way that at horizontal arrangement of the plate the nozzles disposed underneath act under greater pressure than those acting from above. The temperatures of the air may be regulated so that the tempering process itself is not affected. As always in air tempering, it is important to provide for as many nozzles as possible and uniformly and regulatably to supply and discharge the blast air in known manner while the plate is vertically suspended.

Particularly effective is a combination of the mechanical action of tension members and of blast pressure acting with different force upon both sides of the plate.

Figure 2:
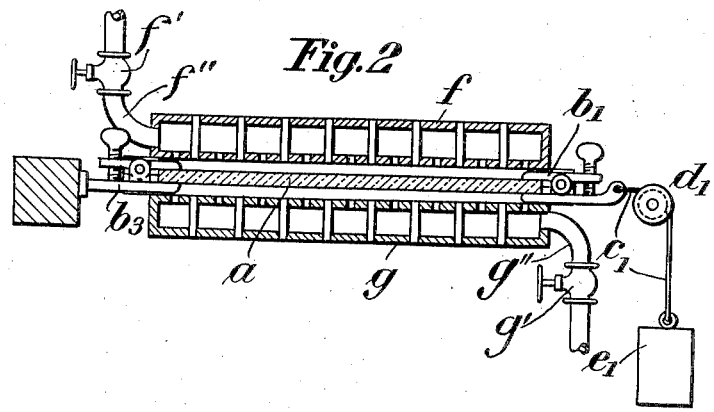

By way of example, the invention is illustrated in the accompanying drawing which shows a device for carrying out the method according to the invention and in which Figure 1 is a top view of the device holding a plate to be tempered and Fig. 2, a vertical section thereof indicating also the blast nozzles.

Referring to the drawing, $a$ is the plate, and $b_1$, $b_2$ and $b_3$, $b_4$ are tongs of known construction for holding the plate $a$. The tongs $b_3$ and $b_4$ are secured to a frame, etc. The tongs $b_1$ and $b_2$ are connected with the weights $e_1$, $e_2$ by means of the ropes $c_1$, $c_2$ and the reversing rollers $d_1$, $d_2$. $f$ and $g$ designate arrangements of blast nozzles acting, respectively, upon the upper and lower side of the plate. The nozzles $g$ preferably work at higher pressure. The force of the jets may be controlled by valves $f'$ and $g'$ in pipes $f''$ and $g''$ supplying the jets $f$ and $g$, or by other suitable means.

The tongs may of course be provided also on all four sides of the glass plate.

The invention is not restricted to the embodiments shown and described, but may be varied in many ways without departing from its fundamental idea. For example, the tensile forces may be exerted through springs, etc. instead of by weights. If the plate to be tempered is inclined at an angle relative to the horizontal instead of being placed in an absolutely horizontal position, which is possible within the scope of the invention, the device must be changed accordingly to make allowance for deflection and the components of gravity acting in the plane of the plate whilst the blast nozzles must be disposed at both sides of the plate corresponding to the plane thereof.

I claim:

1. The method of tempering a flat sheet of glass which consists in holding the heated sheet at an angle to the vertical, by continuous, substantially even tension applied to opposite sides of the sheet, and free from supporting contact of any solid with the under face of the sheet between its edges, and applying currents of cooling fluid to the opposite faces of the sheet while it is so held.

2. A method in accordance with claim 1 and wherein the applied tension is yielding and does not vary with shrinkage of the plate during cooling.

3. A method in accordance with claim 1 and wherein the plate is held substantially horizontal.

4. A method of tempering a flat sheet of glass which consists in holding the heated sheet in an approximately horizontal position solely by yielding tension applied to opposite edges of the sheet, applying cooling gas to both faces of the sheet, but with more force to the under face of the sheet to partially overcome the tendency of the weight of the sheet to make it sag, and regulating the temperatures of the cooling gas so that the tempering is not rendered unequal by the greater force of application of the gas to the under surface of the sheet.

5. A device for tempering a glass sheet comprising in combination means to apply tension to the sheet in a substantially horizontal plane and sufficient to hold the sheet in said plane, and means to apply jets of cooling air to both faces of the sheet.

6. Apparatus in accordance with claim 5 and the means to apply jets comprising means to operate the jets so that they are applied more forcibly to the under face of the sheet than to the upper face.

7. The method of tempering a flat sheet of glass which consists in holding the heated sheet at an angle to the vertical by continuous, substantially even tension applied to opposite sides of the sheet and free from supporting contact of any solid with the under face of the sheet between its edges, and applying currents of cooling fluid to the opposite faces of the sheet while it is so held, the fluid being applied to the under side of the sheet with a force sufficiently greater than that with which it is applied to the upper side of the sheet to at least partially overcome the tendency of the weight of the sheet to make it sag.

BERNHARD ENGELS.